United States Patent [19]
Hayden, Sr.

[11] Patent Number: 5,108,473
[45] Date of Patent: Apr. 28, 1992

[54] DUST COLLECTOR WITH ATMOSPHERIC BACKFLUSH

[76] Inventor: Robert E. Hayden, Sr., 17912 Hoffman Ave., Cerritos, Calif. 92701

[21] Appl. No.: 717,900

[22] Filed: Jun. 19, 1991

[51] Int. Cl.$^5$ .................................. B01D 46/00
[52] U.S. Cl. .......................... 55/302; 137/625.2; 137/625.44
[58] Field of Search ............... 55/302, 293, 498, 283; 137/625.44, 625.2

[56] References Cited

U.S. PATENT DOCUMENTS

| | | | |
|---|---|---|---|
| 2,035,747 | 3/1936 | Harris | 137/625.44 |
| 2,040,930 | 5/1936 | Frisch | 137/625.44 |
| 3,541,764 | 11/1970 | Astrom | 55/302 |
| 3,648,442 | 3/1972 | Bourne | 55/294 |
| 3,726,066 | 4/1973 | Colley et al. | 55/302 |
| 4,113,449 | 9/1978 | Bundy | 55/96 |
| 4,161,389 | 7/1979 | Staffin et al. | 432/58 |
| 4,218,227 | 8/1980 | Frey | 55/302 |
| 4,292,053 | 9/1981 | Remillieux | 55/96 |
| 4,345,922 | 8/1982 | Grassel | 55/302 |
| 4,486,201 | 12/1984 | Noguchi | 55/96 |

FOREIGN PATENT DOCUMENTS

| | | | |
|---|---|---|---|
| 281248 | 8/1971 | U.S.S.R. | 55/283 |
| 1323265 | 7/1973 | United Kingdom | 55/302 |

*Primary Examiner*—Bernard Nozick
*Attorney, Agent, or Firm*—James D. Thackrey

[57] ABSTRACT

A dust collector based on filtration of dirty air in which the periodic backflushing of filtration elements is done by admitting atmospheric air at the filtration element exit port. The air is sucked backwards through the filtration element by the dust collector exit blower. Switching between normal usage and backflush is done by inserting a diverter valve containing a valve chamber between the filtration element discharge part and the clean air chamber. The porting of this valve chamber may be to either the atmosphere or to the clean air chamber, which being determined by twisting a shaft slightly less than 90 degrees, said shaft having valve closure plates attached to it at slightly greater than 90° to each other. Twisting force need not be applied during normal operation nor to close off the atmospheric air port. Further, dust shields are provided around each filtration element to prevent backflushed dust moving directly to an adjacent filtration element.

10 Claims, 2 Drawing Sheets

DUST COLLECTOR WITH ATMOSPHERIC BACKFLUSH

BACKGROUND OF THE INVENTION

1. Field of the Invention

This invention pertains to mechanisms for filtering dust or particulate matter from air streams. It discloses a method, heretofore unknown, for backflushing the filtration elements ordinarily used to separate the dust from dust-laden air.

2. Description of Prior Art

The conventional dust collector, those operating by filtration, consists of a cabinet essentially airtight and operating throughout its internal parts at sub-atmospheric pressure created by a blower at the point where cleaned air is discharged from the cabinet to free air. Thus, any inadverdant leakage being inward, dust cannot be spread to the vicinity. The inlet to the cabinet directs dirty air into a dirty air compartment inside the cabinet, which also has a clean air compartment. Filters hang in the dirty air compartment with their interior ported to the clean air compartment, thus collecting dust particles on the exterior surface of the filtration element. After a short period of operation, the tiny passages for air through the filtration element become even smaller due to the buildup of dust thus effected. Eventually, these passages of the filtration element becomes so clogged they pass too little volume of air and that with too much pressure drop, and the filtration element needs cleaning of the collected dust.

Cleaning has been conventionally done in several ways, beating and a short burst of air in a high pressure backflow being the usual methods. Both agitate the wall portion of filter, say a cartridge carrying porous thick paper-like material heavily pleated so as to expose an expanded area to the dust-laden air without taking up too much cabinet space. The backflow is preferred today because it dislodges the accumulated dirt without damaging the filtration element material; physical agitation can damage it. But with high pressure air bursts, a certain amount of physical agitation is inevitable. Both conventional methods have another drawback, however.

The designer of the system knows that it must be sized to operate ideally with a basic amount of passage-clogging due to the buildup of exterior dust. So the original pore size of the filtration element is oversize, and the designer counts on a certain layer of dust called the "cake" being present even after cleaning. This is a designed-in property of the overall system; thoroughly cleaned filtration elements would pass too large particles with too low pressure drop. For reference, as the dust layer builds up in thickness, it filters ever finer and the pressure drop through it continually rises. The designed operating dust-layer thickness range is not from zero to some selected thickness, but from a cake thickness to some selected thickness. If the cake is not present locally, the filtration is locally such that over-large particles pass through. So physical agitation may not only damage the structure of the filtration element, but may also cause a local and temporary condition of improper, inadequate performance.

My invention, depending as it does on a relatively gentle backflow with minimum deflection of, say the cartridge walls (thick paper-like material), avoids the above problems with conventional cleaning methods as fully as they can be avoided in practice.

In the prior art one other device (Bourne. U.S. Pat. No. 3,648,442) incorporates the advantages described above. Bourne obtains clean air from the clean-air plenum or compartment, passes it through a blower located inside or outside the cabinet, and directs it into the filter discharge passages using an arm which sweeps circularly around the clean-air compartment. My invention dispenses with his blower and arm and the associated mechanism, replacing them with a much cheaper and more reliable valve, one for each cartridge.

In the prior art no provision was generally made for preventing the dislodged dust from the filter being cleaned from passing directly to adjacent filters which are normally still operating during the cleaning process. My observations during tests I have conducted show this is exactly what occurs. Remillieux (U.S. Pat. No. 4,292,053) teaches using partial separation walls amid the hanging filters to reduce this effect. In my preferred dust collector I have provided dust shields surrounding the cartridge filters and installed with them, avoiding the problem with his concept of getting rid of the shields or working between them during filter replacement. This save down-time.

SUMMARY OF THE INVENTION

Since the cabinet of a dust collector is kept below atmospheric pressure, all that is necessary to obtain back-flush atmospheric air to clean the filters is to close the passage between the filter outlet and the clean-air plenum and simultaneously to open passage between the filter outlet and the external atmosphere. My invention accomplishes this by having closure means consisting of two plates on a single stem or shaft, the plates covering one or the other adjacent ports. The plates are moved into or out of closure by rotating the stem on its axis; since they extend sideways from the stem at roughly right angles from each other and since the ports are side-by-side, the opening of one valve automatically means the other is closing. The two ports referred to are really two ends of one long rectangular opening without a bar across the middle. The functions of the bar, allowing separate ducts one going to the clean air chamber and one going to the atmosphere on the one side (outside of the port) and both going to the filter outlet on the other side (inside of the port), is unnecessary since the duct going to the atmosphere provides the only wall necessary to meet the needed function on the outside of the port, and both ducts lead to the filter outlet on the inside of the port.

This construction cooperates with the desirability of applying force to the valve only during cleaning; air pressure keeps the air inlet shut off during normal operation since the filter outlet pressure is sub-atmospheric at that time.

The above describes the diverter valve. The other part of my invention, a concentric dust shield around the filter to isolate the dirt falling during cleaning from the active, adjacent filters, is simply common sense which has escaped the notice of those skilled in the art.

DETAILED DESCRIPTION

Figure 1:
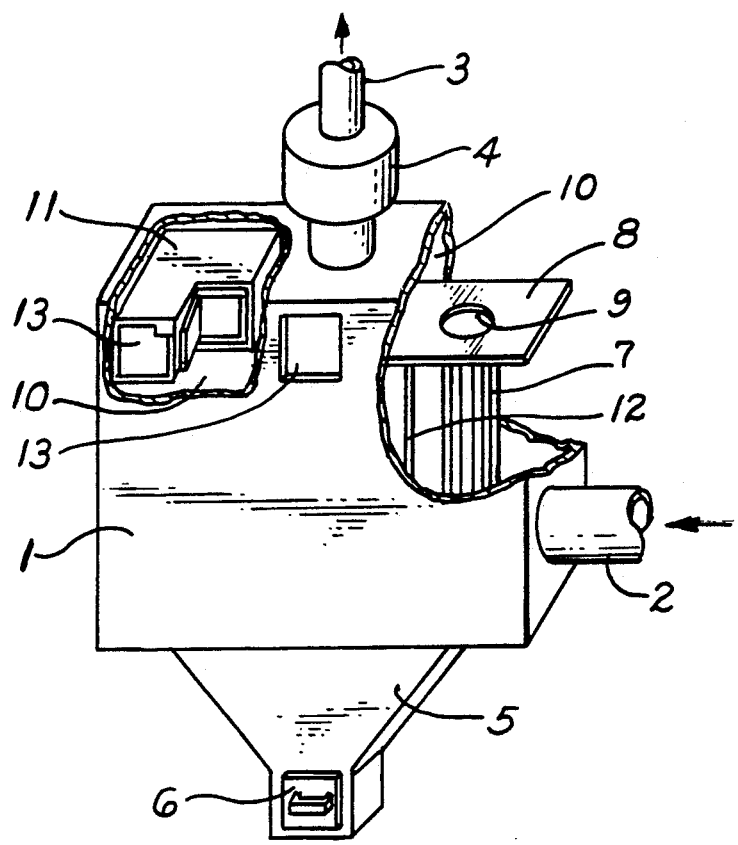
FIG. 1 is a perspective view of the complete dust collector, with the cabinet cut away on the left to show the diverter valve and on the right to stow the separator plate between clean and dirty air, and the filter and one version of dust shield. The cycle control unit is omitted
Figure 2:
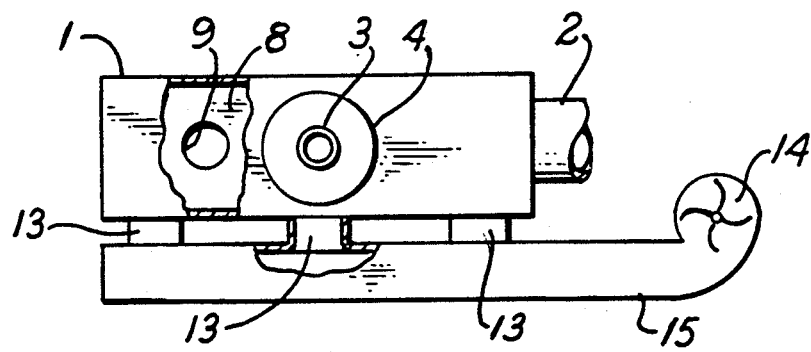
FIG. 2 is a view from the top of the dust collector of FIG. 1, in which the diverter valve is not shown in order to show the filter outlet beneath it, with an auxiliary duct and blower supplying atmospheric air.
Figure 3:
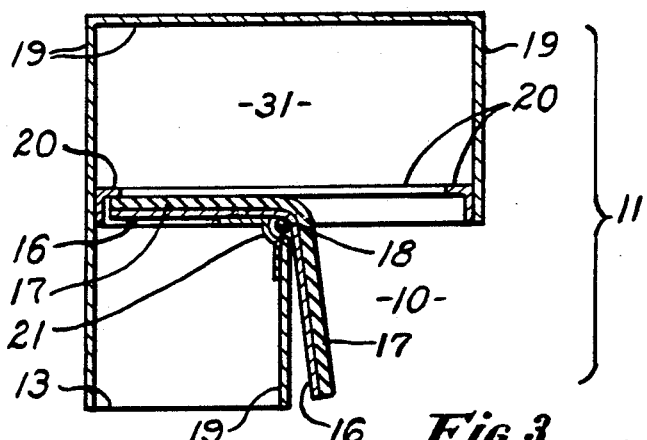
FIG. 3 is a plan view (a horizontal cross section) of the diverter valve in the non-cleaning position.

In FIG. 1, Item 1, is the overall dust collector in the preferred embodiment; Item 2 is the inlet for dust-laden gas or air; and Item 3 the exhaust for clean air. Inlet 2 opens directly into the interior of dust collector 1 which is one large open chamber below divider plate Item 8 and comprises the dirty air chamber (not numbered). Above divider plate 8 is clean air chamber Item 10, open space surrounding diverter valve Item 11 on its sides and top; the bottom of divertor valve 11 rests on divider plate 8 directly over filter outlet hole Item 9 (as shown in FIG. 2). Filter outlet hole 9 is where the filter opens into valve chamber 31. There are a number of filters Item 7 with outlet holes 9 each covered with its own diverter valve 11 in dust collector 1. Obviously, if the dust collector is large and has a dozen or so filters, atmospheric air to the diverter valves can be provided through a manifold located within clean-air chamber 10. However, for relatively small collectors 1, it is more reasonable to bring each diverter valve air inlet port Item 13 to the surface of the collector cabinet as shown in FIGS. 1, 2 and 3. The item 13 is used to identify the port; i.e., both the opening on the exterior surface of dust collector 1 and the opening at the air inlet of diverter valve 11. Item 4 (FIG. 1) is the suction blower which sucks dirty air from the source and causes the flow through filter 7 which removes the dirt and renders the exhaust gases clean. FIG. 1 also shows a conventional dust collection chute Item 5 and cleanout Item 6. Item 12 is one version of dust shield to prevent dust being blown off one filter 7 from being immediately deposited on the adjacent filter 7.

FIG. 2 shows a view of dust collector 1 from above. At the left a cutout shows how collector 1 would appear if diverter valve 11 were omitted from the leftmost filter. FIG. 2 also shows an atmospheric air manifold Item 15 supplying backflow air to port 13 of several filters. Blower Item 14 may be needed in some installations to increase slightly the backflush air pressure required to get sufficient backflush air flow through feeding air to the manifold.

FIG. 3 shows a horizontal cross-section of diverter valve 11 in the non-flushing position. Item 19 is the body of the valve and Item 20 the two valve seats, side by side and running together in one elongated rectangular opening in the preferred embodiment. The movable plug parts of the valve, whose function is to cover or uncover the valve seats, is two valve plates Item 16 faced with gasketing material Item 17 and sealingly fixed to shaft (or stem) Item 18. Shaft 18 is located at the vertex of the 90 degree plus angle in valve plates 16. To operate the valve external means twists shaft 18 roughly a quarter turn. The wall of the duct conveying atmospheric air to valve chamber 31, the dividing wall, which runs perpendicular to valve seats 20 at shaft 18 stops short of contacting shaft 18 creating a narrow slot which will leak air into clean air chamber 10 during normal operation. The dividing wall is in direct line with shaft 18. This leakage slot is better seen in FIG. 7. Flexible sealing tape Item 21, also shown in FIG. 6 largely stops the leakage referred to above; some leakage at the top and bottom of flexible sealing tape 21 can be tolerated.

Figure 4:
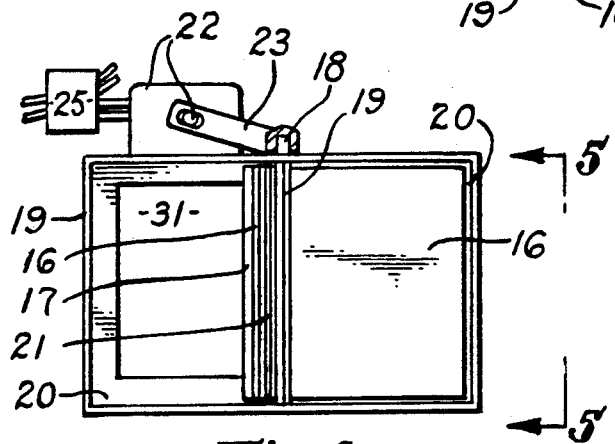
FIG. 4 is a front view of the diverter valve in the cleaning position. The solenoid shown is a push solenoid for ease of illustration; a pull solenoid is the preferred embodiment.
Figure 5:
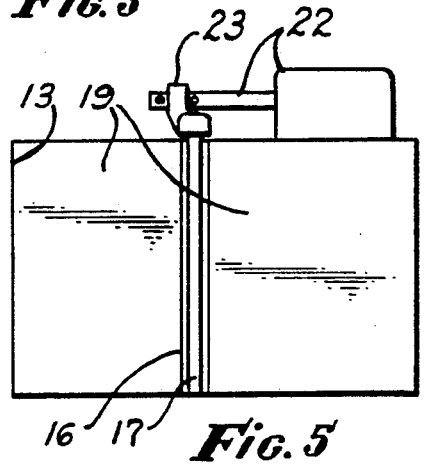
FIG. 5 is a side view of FIG. 4 (right side).
Figure 6:
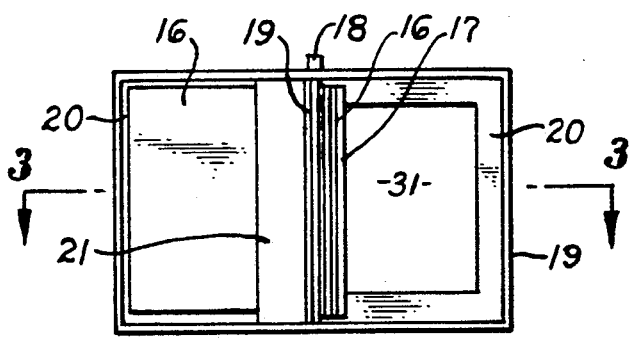
FIG. 6 is a partial front view showing valve plate position of the diverter valve plates in a non-cleaning position. Except for valve position and omission of the solenoid the view is the same as FIG. 4.

In FIGS. 3, 4, and 6, Item 31 represents the valve chamber, which has the shape of a rectangular box open on the bottom to receive clean filtered air from filter outlet hole 9 over which the diverter valve 11 sits. Valve chambers 31 thus lie in the air flow path between the dirty air chamber and clean air chamber 10.

FIGS. 4 and 6 show the two (rectangular) valve plates 16 comprising the closure means for the valve seats 20 in the two positions the valve can assume. These figures are considered self-explanatory, and show only three new elements in FIG. 4. A conventional solenoid Item 22 twists shaft 18 by engaging a lever Item 23, thus constituting a twisting means. During normal operation no current need be applied to solenoid 22, since differential pressure on the faces of plate 16 tend to close the valve in the absence of force from solenoid 22; and once it is closed, tend to keep it closed as shown in FIG. 6. Ensuring that only one direction of force application is necessary is the major reason the two valve plates 16 are angled at more than 90 degrees to each other. Tests have shown reliance on air pressure to close the backflush air off is thoroughly reliable and quick acting. Bearings, acting as positioning means Item 32 retain shaft 18 and valve plates 16.

Figure 7:
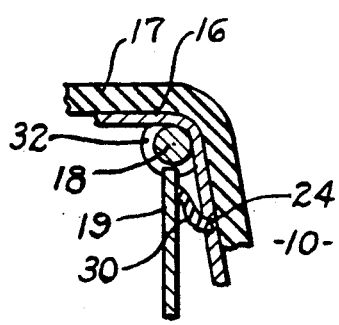
FIG. 7 is a partial view, from above, of an alternate means of blocking air leakage across where the valve shaft joins the air duct wall. Refer to the area around valve shaft 18 in FIG. 3.
Figure 10:
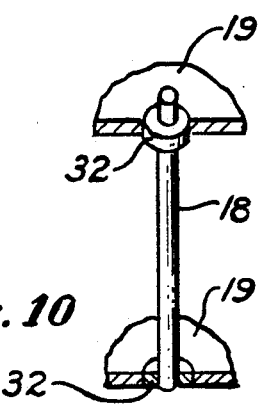
FIG. 10 shows the valve positioning means in perspective, with the valve plates which are normally attached to it omitted. A cross sectional view at the midpoint of valve shaft 18 is as depicted in FIG. 3.

FIG. 7 shows a cross sectional view of an alternate means of sealing the slot referred to above. Air is permitted past the slot, but is blocked from proceeding along valve plates 16 by linear lip seal 30, made of elastomer and cemented into a slot on valve plates 16 by cement means 24. Because this construction allows atmospheric air to flow up and down (perpendicular to the cross section of FIG. 7) in the small pocket between lip seal 30 and shaft 18, flexible sealing tape 21 remains the preferred embodiment.

In a complete working dust filtration system, some provision for automatic, periodic cleaning cycles needs to be made to keep the dust-making equipment in continuous operation. Cleaning cycle controller Item 25, shown in FIG. 4, provides this function. It is considered within the capacity of those skilled in the art to construct cleaning cycle controller 25.

Figure 8:
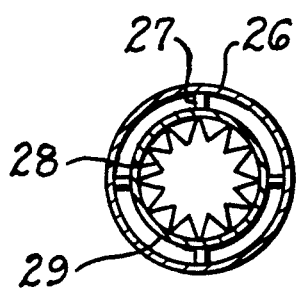
FIG. 8 shows a cross section of a cartridge filter combined with a circular, integral dust shield.
Figure 9:
FIG. 9 shows a complete side view of a cartridge filter with the circular dust shield of FIG. 8. The dust shield is shown in cross section. Item 28 represents a pleated filtration element.

FIGS. 8 and 9 show cross sectional views of a cartridge filter 7 incorporating a dust shield Item 26 spaced from the exterior of the pleated filtration element 28 by standoffs items 27. It would be obvious to incorporate standoffs 27 into the existing endplates Item 29 of the cartridge filter. It would also be obvious to make dust shield 26 square in cross section rather than circular. This is an alternative, and the preferred embodiment, to building the dust shield 12 of FIG. 1 into the cabinet or separator plate 8 dividing the clean air compartment 10 from the dirty air compartment.

It should be said that a dust collector operating on the atmospheric air backflush principle has been built with transparent cabinet walls and tested. Immediately upon introducing atmospheric pressure inside the cartridge filters a dense cloud of dust appears and, if shielded, falls rather than flowing to an adjacent filter. Further flushing for a total of two or three seconds renders the filter clean, with a stable and repeatable pressure drop indicating the existence of a smooth and predictable coating of cake. The metallic bands normally provided around the outer surface of the filtration element can be omitted due to the gentleness of the backflush, reducing cartridge cost and increasing filtration surface effective area.

The invention having been described in its preferred embodiment, it is obvious that modifications on it can be made by those skilled in the art without exercise of the inventive faculty. Therefore, the scope of the invention is to be considered the scope of the following claims.

I claim:

1. In a dust collector having a plurality of filters cleaned by backflushing an improvement comprising:
   a plurality of diverter valves comprising two valve seats, formed by dividing a rectangular opening communicating with a valve chamber into which the filter opens into two portions along the rectangle's long side by means of a dividing wall extending from between said valve seats away from the valve chamber, the dividing wall forming one side of a duct conveying atmospheric air to one of said valve seats, and the other valve seat opening into the clean air chamber, and
   two valve plates overlapping said valve seats, not in the valve chamber, and having one side of each attached to a shaft at an angle to each other between 100 degrees and 90 degrees, the shaft being inside the vertex of that angle, and
   gasketing material attached to said valve plates where they overlap said valve seats, and
   positioning means for the shaft which positions the shaft and said valve plates at such a distance from said valve seats that said gasketing material is slightly compressed when either valve plate is made active by rotating the shaft appropriately, and in direct line with the dividing wall, and
   flexible sealing tape extending from the atmospheric air valve plate to the dividing wall and of length corresponding to the inner dimension of the duct conveying atmospheric air thus reducing air leakage between the shaft and the dividing wall during normal operation when the atmospheric air valve plate is closed, and
   twisting means for remotely rotating the shaft, each said diverter valve being located directly over a filter outlet in the clean air chamber, the normal filtering position of each said diverter valve being open to the clean air chamber and closed to the atmosphere and the backflush position simultaneously closing flow to the clean air chamber and opening a port to atmospheric air, reversing flow through the filter and thus backflushing one filter.

2. A device as in claim 1 additionally comprising:
   a cleaning cycle controller controlling the timing and duration of backflushing on each individual filtration element.

3. A device as in claim 1 additionally comprising:
   a dust shield surrounding each filter, open at least at the bottom to permit dust laden gases to enter the space between the exterior of said filter and the interior of said dust shield and also to permit, during the backflushing, dust to fall instead of flowing to an adjacent filter.

4. A device as in claim 1 in which said dust shield is attached to said filter.

5. A diverter valve for use in dust collectors in which the normal flow of clean air out of the filter and into the clean air chamber may be interrupted and replaced with air flow in a reverse direction through the filter, comprising:
   two valve seats, formed by dividing a rectangular opening communicating with a valve chamber into which the filter opens into two portions along the rectangle's long side by means of a dividing wall extending from between said valve seats away from the valve chamber, the dividing wall forming one side of a duct conveying atmospheric air to one of said valve seats, and the other valve seat opening into the clean air chamber, and
   two valve plates overlapping said valve seats, not in the valve chamber, and having one side of each attached to a shaft at an angle to each other between 100 degrees and 90 degrees, the shaft being inside the vertex of that angle, and
   gasketing material attached to said valve plates where they overlap said valve seats, and
   positioning means for the shaft which positions the shaft and said valve plates at such a distance from said valve seats that said gasketing material is slightly compressed when either valve plate is made active by rotating the shaft appropriately, and in direct line with the dividing wall, and
   flexible sealing tape extending from the atmospheric air valve plate to the dividing wall and of length corresponding to the inner dimension of the duct conveying atmospheric air thus reducing air leakage between the shaft and the dividing wall during normal operation when the atmospheric air valve plate is closed, and
   twisting means for remotely rotating the shaft.

6. A device as in claim 5, wherein said twisting means is a solenoid and arm.

7. A device as in claim 5, in which the two valve seats each have an open area at least as large as the transverse area at the discharge port of the filter.

8. A diverter valve for use in dust collectors in which the normal flow of clean air out of the filter and into the clean air chamber may be interrupted and replaced with air flow in a reverse direction through the filter, comprising:
   two valve seats, formed by dividing a rectangular opening communicating with a valve chamber into which the filter opens into two portions along the rectangle's long side by means of a dividing wall extending from between said valve seats away from the valve chamber, the dividing wall forming one side of a duct conveying atmospheric air to one of said valve seats. and the other valve seat opening into the clean air chamber, and two valve plates overlapping said valve seats, not in the valve chamber, and having one side of each attached to a shaft at an angle to each other between 100 degrees and 90 degrees, the shaft being inside the vertex of that angle. and gasketing material attached to said valve plates where they overlap said valve seats, and positioning means for the shaft which positions the shaft and said valve plates at such a distance from said valve seats that said gasketing material is slightly compressed when either valve plate is made active by rotating the shaft appropriately, and in direct line with the dividing wall, and a linear lip seal between the shaft side of the valve plate which connects the valve chamber to the clean air chamber and the dividing wall, and cement means on the base part of said linear lip seal, and twisting means for remotely rotating the shaft.

9. A device as in claim 8, wherein said twisting means is a solenoid and arm.

10. A device as in claim 8, in which the two valve seats each have an open area at least as large as the transverse area at the discharge port of the filter.

* * * * *